(12) United States Patent
Tamura

(10) Patent No.: US 11,623,151 B2
(45) Date of Patent: *Apr. 11, 2023

(54) INFORMATION PROCESSING DEVICE AND CONTROL METHOD FOR EXECUTING A BATTLE GAME INCLUDING A FIELD

(71) Applicant: GREE, Inc., Tokyo (JP)

(72) Inventor: Makiko Tamura, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,512

(22) Filed: Nov. 17, 2021

(65) Prior Publication Data
US 2022/0072434 A1 Mar. 10, 2022

Related U.S. Application Data

(63) Continuation of application No. 16/865,561, filed on May 4, 2020, now Pat. No. 11,207,602, which is a (Continued)

(30) Foreign Application Priority Data

Feb. 26, 2014 (JP) .............................. JP2014-035824

(51) Int. Cl.
*A63F 13/822* (2014.01)
*A63F 13/533* (2014.01)
(Continued)

(52) U.S. Cl.
CPC ............ *A63F 13/822* (2014.09); *A63F 13/44* (2014.09); *A63F 13/533* (2014.09);
(Continued)

(58) Field of Classification Search
None
See application file for complete search history.

(56) References Cited

U.S. PATENT DOCUMENTS 3,973,775 A 8/1976 Bolan et al.
6,398,651 B1 6/2002 Yamada
(Continued)

FOREIGN PATENT DOCUMENTS

JP 2000-325528 A 11/2000
JP 2002-239240 A 8/2002
(Continued)

OTHER PUBLICATIONS

IGN, Mario Party 8 Wiki Guide, May 29, 2007, http://www.ign.com/wikis/mario-party-8/Basics.
(Continued)

*Primary Examiner* — Jason T Yen
(74) *Attorney, Agent, or Firm* — Maier & Maier, PLLC

(57) ABSTRACT

Instructions recorded on a non-transitory recording medium cause an information processing device that executes a battle game to execute the steps of storing different attribute information in association with each of at least two players; displaying a field including a plurality of regions, a predetermined event being set for each region, and attribute information being associable with each region; upon a player selecting at least one region from among the plurality of regions, executing processing for the event of the selected region; based on a processing result for the event, determining whether newly to associate the attribute information of the player with the selected region; and determining victory and defeat for the plurality of players based on at least one of a count, a total area, and a total volume of regions with which each piece of attribute information is associated.

20 Claims, 15 Drawing Sheets

Related U.S. Application Data continuation of application No. 15/833,469, filed on Dec. 6, 2017, now Pat. No. 10,675,545, which is a continuation of application No. 14/629,971, filed on Feb. 24, 2015, now Pat. No. 9,861,897.

(51) Int. Cl.
*A63F 13/537* (2014.01)
*A63F 13/44* (2014.01)
*A63F 13/69* (2014.01)

(52) U.S. Cl.
CPC ............ *A63F 13/537* (2014.09); *A63F 13/69* (2014.09); *A63F 2300/303* (2013.01); *A63F 2300/65* (2013.01); *A63F 2300/807* (2013.01)

(56) References Cited

U.S. PATENT DOCUMENTS

| | | | | |
|---|---|---|---|---|
| 2004/0259613 | A1* | 12/2004 | Machida | A63F 13/58 463/1 |
| 2007/0288969 | A1* | 12/2007 | Prum | A63F 13/235 725/135 |
| 2009/0298585 | A1* | 12/2009 | Cannon | A63F 13/22 463/31 |
| 2013/0053149 | A1* | 2/2013 | Rouse | H04W 4/21 463/42 |
| 2013/0331162 | A1* | 12/2013 | Krivicich | A63F 13/533 463/9 |
| 2014/0008868 | A1* | 1/2014 | Patria | A63F 3/00643 273/260 |
| 2014/0128154 | A1* | 5/2014 | Asano | A63F 13/795 463/29 |
| 2015/0119140 | A1* | 4/2015 | Ikeda | A63F 13/5372 463/31 |

FOREIGN PATENT DOCUMENTS

| | | |
|---|---|---|
| JP | 2002-239242 A | 8/2002 |
| JP | 2003-079956 A | 3/2003 |
| JP | 2005-066043 A | 3/2005 |
| JP | 2008-220984 A | 9/2008 |
| JP | 2013-152686 A | 8/2013 |
| JP | 6224166 B2 | 11/2017 |

OTHER PUBLICATIONS

IGN, Mario Party 8 Wiki Guide, May 29, 2007, http://www.ign.com/wikis/mario-party-8/Boards_part_5.

IGN, Mario Party 8 Wiki Guide, May 29, 2007, http://www.ign.com/wikis/mario-party-8/Basics_part_3.

WhitekKakis, YouTube: Mario Party 8—Koopa's Tycoon Town, Jun. 25, 2011, https://www.youtube.com/watch?v=xEEvMXago4c.

Cococrispys, Mario Party 8, Jun. 28, 2007, http://www.gamefaqs.com/wii/935598-mario-party-8/reviews/114870.

GamesRadarChrisAntista, Ultimate Mario Party 8 guide, May 31, 2007, http://www.gamesradar.com/ultimate-mario-party-8-guide/2/.

Japanese Office Action dated Dec. 15, 2015, in connection with corresponding JP Application No. 2015-212951 (6 pgs., including English translation).

"Mario Party 8, Almost Perfect! Guidebook for Winning", Enterbrain, Inc., Sep. 1, 2007, pp. 26-27 (5 pgs.).

Japanese Office Action dated Apr. 18, 2017, in connection with corresponding JP Application No. 2016-105311 (5 pgs., including English translation).

Sengoku Basara 4 the Complete Guide, Kadokawa Corporation, Feb. 22, 2014, first edition, pp. 18, 182, 183, 298, and 299 (8 pgs. total).

Japanese Office Action dated Apr. 21, 2015, in connection with JP Application No. 2014-035824 (9 pgs).

Culdcept Second Expansion Official Guidebook, Media Factory, Inc., Sep. 26, 2002, First Edition, pp. 24-33 (13 pgs).

Office Action dated May 7, 2019, in corresponding Japanese Application No. 2017-194458; 7 pages.

Office Action dated Sep. 18, 2018 in corresponding Japanese Application No. 2017-194458; 7 pages including English-language translation.

* cited by examiner

FIG. 2

|   | a | b | c | d |
|---|---|---|---|---|
| 4 | a4 | b4 | c4 | d4 |
| 3 | a3 | b3 | c3 | d3 |
| 2 | a2 | b2 | c2 | d2 |
| 1 | a1 | b1 | c1 | d1 |

FIG. 4

| Region ID | Event ID | Attribute information | Cost points | | | | Cumulative score | | | |
|---|---|---|---|---|---|---|---|---|---|---|
| | | | A | B | C | D | A | B | C | D |
| a1 | Event 01 | - | 30 | 30 | 30 | 30 | *** | *** | *** | *** |
| a2 | Event 02 | - | 10 | 10 | 10 | 10 | *** | *** | *** | *** |
| a3 | Event 03 | A | 5 | 20 | 15 | 999 | *** | *** | *** | *** |
| ... | ... | ... | ... | ... | ... | ... | ... | ... | ... | ... |
| d4 | Event 16 | - | 30 | 30 | 30 | 30 | *** | *** | *** | *** |

21

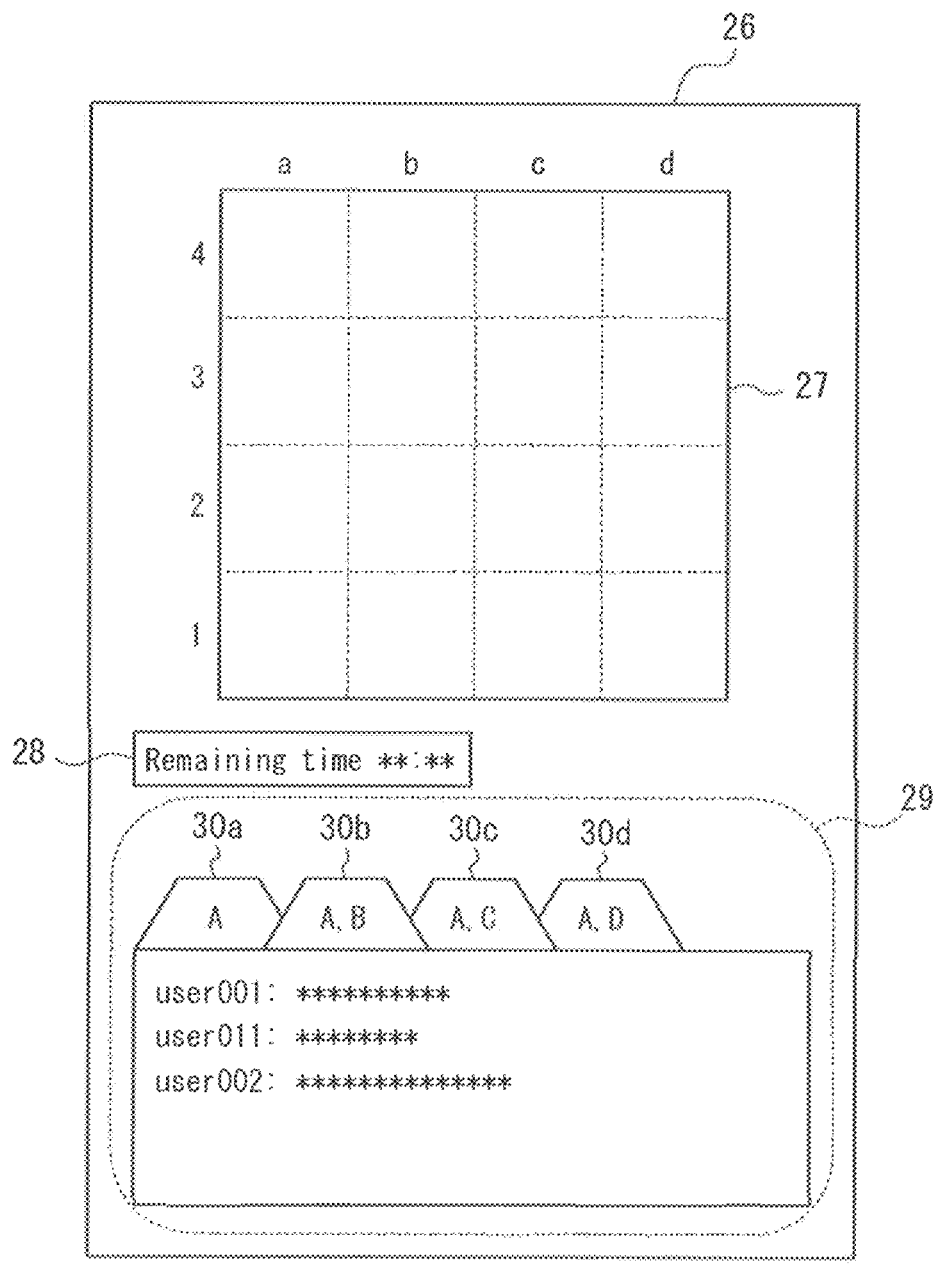

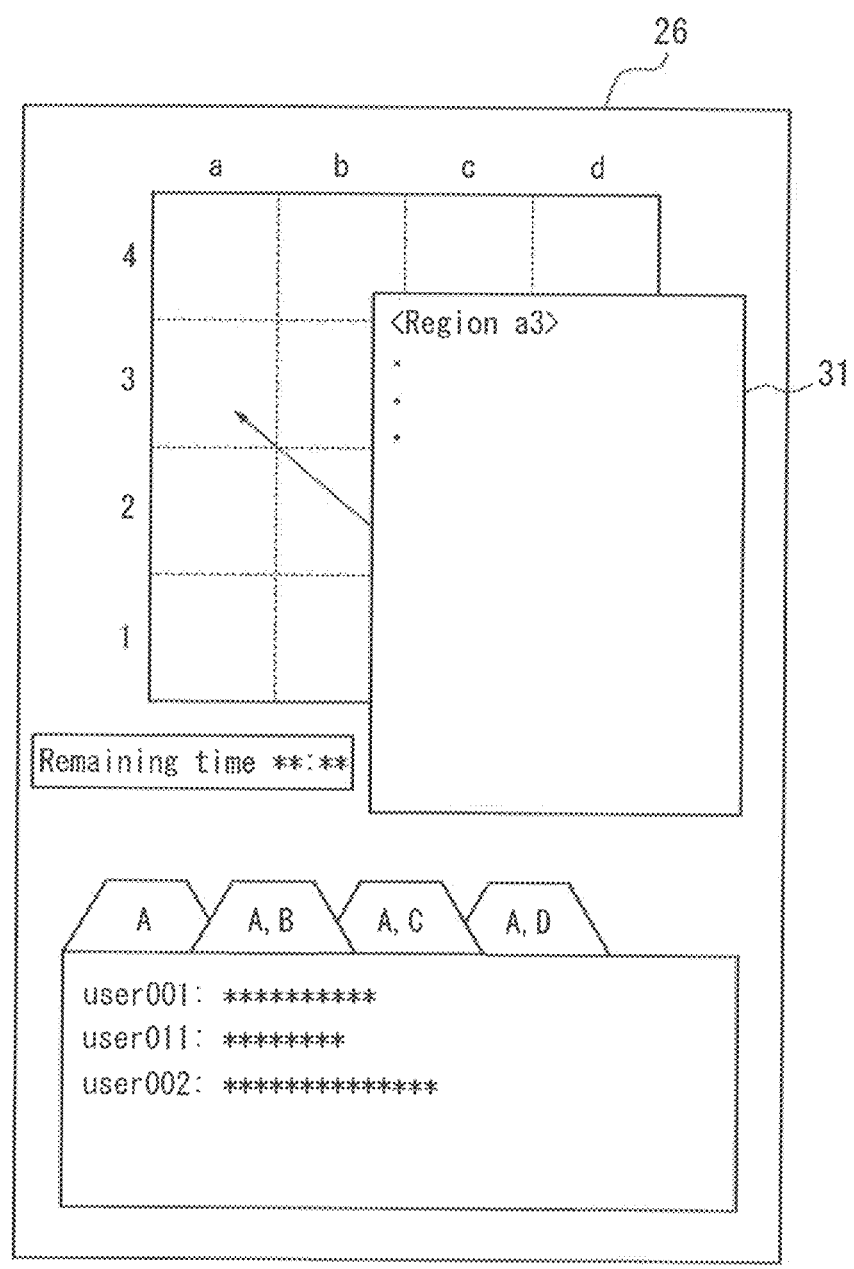

*FIG. 8*

```
<Region a3>
  ·Attribute information A
     Cumulative score   ****pt
     Time of update     **:**
         Cost           5 points
  ·Attribute information B
     Cumulative score   ****pt
     Time of update     **:**
         Cost           20 points
  ·Attribute information C
     Cumulative score   ****pt
     Time of update     **:**
         Cost           15 points
  ※Reduced cost (remaining time **:**)

·Attribute information D
     Cumulative score   ****pt
     Time of update     **:**
         Cost           999 points
  ※Increased cost (remaining time **:**)
```

31

INFORMATION PROCESSING DEVICE AND CONTROL METHOD FOR EXECUTING A BATTLE GAME INCLUDING A FIELD

CROSS-REFERENCE TO RELATED APPLICATION

This application is a continuation of and claims priority to U.S. patent application Ser. No. 16/865,561, filed May 4, 2020, and entitled "Information processing device and control method for executing a battle game including a field," which is a continuation of and claims priority to U.S. patent application Ser. No. 15/833,469, now U.S. Pat. No. 10,675, 545, filed Dec. 6, 2017, and entitled "Information processing device and control method for executing a battle game including a field," which in turn is a continuation of and claims priority to U.S. patent application Ser. No. 14/629, 971, now U.S. Pat. No. 9,861,897, filed Feb. 24, 2015, and entitled "Information processing device and control method for executing a battle game including a field," which in turn claims priority to and the benefit of Japanese Patent Application No. 2014-035824 filed Feb. 26, 2014, the entire contents of which are incorporated herein by reference.

FIELD

The exemplary embodiment described herein relate to a non-transitory recording medium, an information processing device, and a control method.

BACKGROUND

In a game device, a user's deck is formed by a plurality of battle cards or the like, and the game device allows the user to compete with an opponent based on a total value or the like of parameters such as attack strength, defense strength, and the like of the cards in the deck (for example, see JP 2008-220984A and JP 2000-325528A).

In a background game device, however, users may lose interest in the game. For example, in a background game device, a battle mode in which a user directly battles an opponent using the deck is adopted. In this battle mode, the victor is substantially determined by the strength of the cards or the deck. Therefore, a background game device is not necessarily highly strategic during a battle, and users may grow tired of battles.

SUMMARY

A non-transitory recording medium according to an exemplary embodiment is a computer-readable non-transitory recording medium storing instructions to be executed on a computer functioning as an information processing device that executes a battle game, the instructions causing the computer to execute the steps of: storing different attribute information in association with each of at least two players; displaying a field including a plurality of regions, a predetermined event being set for each region, and attribute information being associable with each region; upon a player selecting at least one region from among the plurality of regions, executing processing for the event of the selected region; based on a processing result for the event, determining whether newly to associate the attribute information of the player with the selected region; and determining victory and defeat for the plurality of players based on at least one of a count, a total area, and a total volume of regions with which each piece of attribute information is associated.

In the non-transitory recording medium according to this exemplary embodiment, in the step of executing processing for the event, when predetermined points possessed by the player are equal to or greater than predetermined cost points set for the selected region, the cost points can be subtracted from the points, and processing may be executed for the event of the selected region.

In the non-transitory recording medium according to this exemplary embodiment, when another region exists along a predetermined axis in the field at a distance from the selected region, the same attribute information being associated with the selected region and the other region, and different attribute information than the attribute information of the selected region is associated with an intermediate region between the selected region and the other region along the axis, the instructions can further cause the computer to execute the step of newly associating the same attribute information as the attribute information of the selected region with the intermediate region.

In the non-transitory recording medium according to this exemplary embodiment, the plurality of regions can include a first region and a second region other than the first region, another region existing on both sides of the first region along at least one axis in the field, and the cost points set for the second region may be higher than the cost points set for the first region.

In the non-transitory recording medium according to this exemplary embodiment, the cost points set for each region can increase in response to an increase in elapsed time of the game.

In the non-transitory recording medium according to this exemplary embodiment, a difficulty of the event set for each region may increases in response to an increase in elapsed time of the game.

In the non-transitory recording medium according to this exemplary embodiment, when attribute information is newly associated with a region among the plurality of regions, the instructions can further cause the computer to execute the step of changing the cost points of the region based on the attribute information of the region.

In the non-transitory recording medium according to this exemplary embodiment, in the step of changing the cost points, the cost points of the region can be increased for use by a player with whom is associated attribute information differing from the attribute information of the region.

In the non-transitory recording medium according to this exemplary embodiment, when a player designates at least one region among the plurality of regions and uses a predetermined game medium, the instructions can further cause the computer to execute the step of changing the cost points of the designated region.

In the non-transitory recording medium according to this exemplary embodiment, the instructions can further cause the computer to execute the step of displaying information shared by players other than a player with whom predetermined attribute information is associated.

An information processing device according to another exemplary embodiment is an information processing device for executing a battle game, the information processing device includes: means for storing different attribute information in association with each of at least two players; means for displaying a field including a plurality of regions, a predetermined event being set for each region, and attribute information being associable with each region; means for executing, upon a player selecting at least one region from among the plurality of regions, processing for the event of the selected region and for determining, based on a processing result for the event, whether newly to associate the attribute information of the player with the selected region; and means for determining victory and defeat for the plurality of players based on at least one of a count, a total area, and a total volume of regions with which each piece of attribute information is associated.

A method according to another exemplary embodiment is a method of controlling a battle game executed by an information processing device, the method includes the steps of: storing different attribute information in association with each of at least two players; displaying a field including a plurality of regions, a predetermined event being set for each region, and attribute information being associable with each region; upon a player selecting at least one region from among the plurality of regions, executing processing for the event of the selected region; based on a processing result for the event, determining whether newly to associate the attribute information of the player with the selected region; and determining victory and defeat for the plurality of players based on at least one of a count, a total area, and a total volume of regions with which each piece of attribute information is associated.

A non-transitory recording medium, information processing device, and control method according to exemplary embodiment that can make a battle game more strategic.

BRIEF DESCRIPTION OF THE DRAWINGS

The present invention will be further described below with reference to the accompanying drawings, wherein:

FIG. 2 illustrates a field in a game according to an embodiment of the present invention;

FIG. 4 illustrates the region information in FIG. 1;

FIG. 6 illustrates a basic screen displayed on the display unit in FIG. 1;

FIG. 7 illustrates a basic screen displayed on the display unit in FIG. 1;

FIG. 8 illustrates information related to a region displayed on the display unit in FIG. 1;

DETAILED DESCRIPTION

The following describes various exemplary embodiments.

Figure 1:
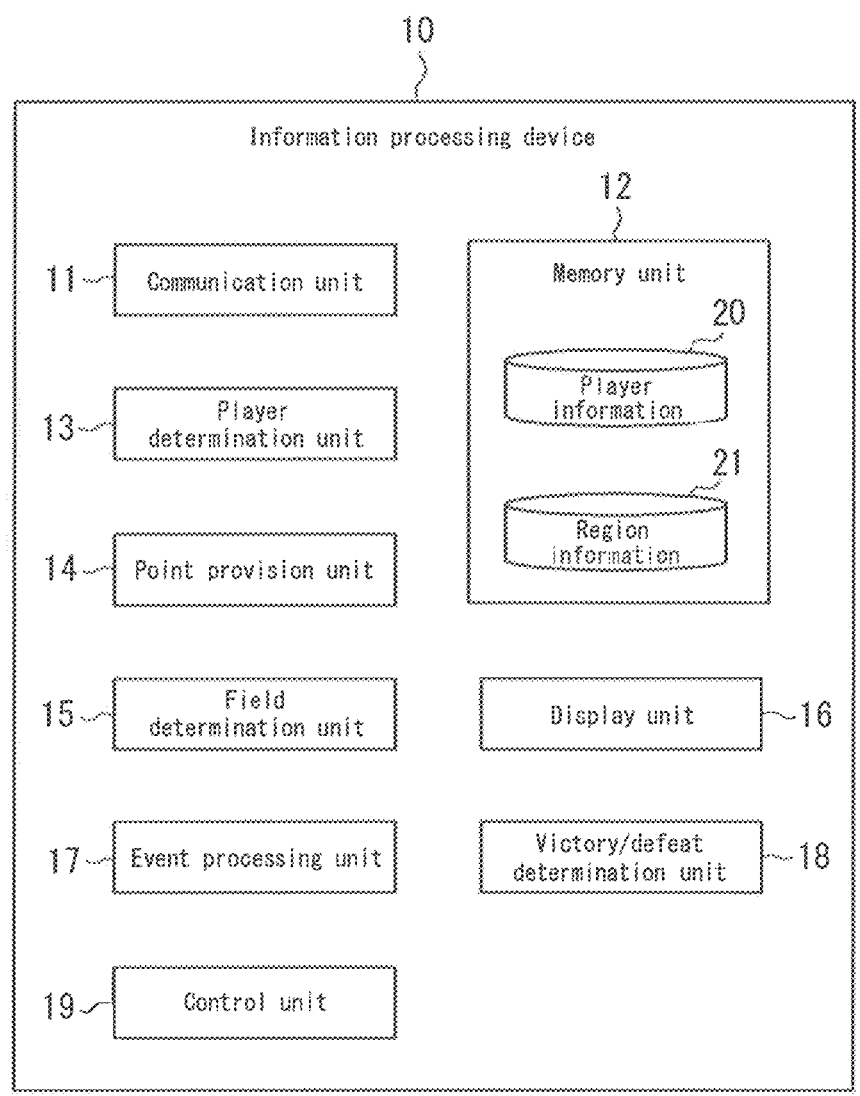
FIG. 1 is a block diagram of an information processing device according to an embodiment of the present invention.

FIG. 1 is a block diagram schematically illustrating the structure of an information processing device 10 according to the exemplary embodiment. The information processing device 10 is, for example, a computer, mobile phone, or the like and can execute a battle game with a plurality of players.

First, an outline of the game according to the exemplary embodiment is provided. A plurality of players, including the user of the information processing device 10, battle in the game according to the exemplary embodiment. Each player other than the user may be a player controlled automatically by the information processing device 10 or a player controlled by the user of another information processing device 10. The game according to the exemplary embodiment has two battle modes: regular battle and special battle.

The regular battle is a battle mode allowing a user to acquire a reward, such as game media, game currency, and the like by using game media that the user holds in order to battle an opponent or complete a mission (quest) within the game. In the exemplary embodiment, the game media can include any sort of media within the game, such as game cards, characters, weapons, armor, items, or the like.

In the special battle, on a game field including a plurality of regions, a plurality of players including the user compete over the number of occupied regions or the total area. The field illustrated in FIG. 2 is four regions wide by four regions high, totaling 16 regions. The regions are indicated below by a combination of the horizontal reference signs (a to d) and vertical reference signs (1 to 4) shown in FIG. 2. For example, the region to the lower left in FIG. 2 is region a1. In the special battle, for example the player that occupies the most regions or the largest total area when a predetermined time has elapsed is the victor.

In order to acquire a region, a player selects a region in the field and participates in an event set for the region. During the event, for example using game media acquired during a regular battle, the player battles a character (Non-Player Character (NPC)) controlled automatically by the information processing device 10. Whether the player acquires the region is determined based on the result of the event. For example, the player acquires the region when the player defeats the NPC, or when the cumulative damage inflicted on the NPC by the player is greater than the cumulative damage inflicted by any other player. When the player acquires two regions that sandwich a region occupied by another player, the sandwiched region (also referred to below as the intermediate region) may also be further acquired. An example of processing to further acquire the sandwiched region is described below.

Next, the constituent elements of the information processing device 10 in FIG. 1 are described. The information processing device 10 includes a communication unit 11, memory unit 12, player determination unit 13, point provision unit 14, field determination unit 15, display unit 16, event processing unit 17, victory/defeat determination unit 18, and control unit 19.

The communication unit 11 can communicate with other information processing devices, such as a server device or a terminal device, over a wired or wireless connection.

The memory unit 12 can store a variety of information used in game processing. The memory unit 12 also stores player information 20 and region information 21.

Figure 3:
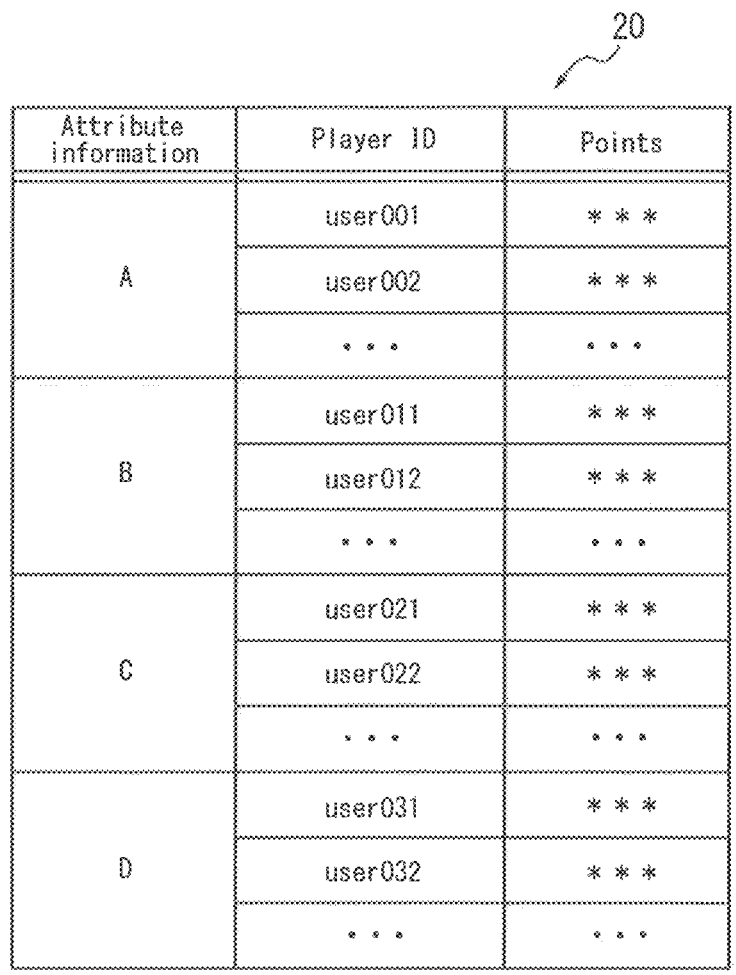
FIG. 3 illustrates the player information in FIG. 1.

The player information 20 is information related to each player participating in the special battle. For example, the player information 20 illustrated in FIG. 3 includes attribute information, a player ID identifying a player, points, and cumulative damage.

The attribute information is information indicating an attribute associated with each player. In the exemplary embodiment, there are four types of attribute information, attribute information A to D, yet it suffices for there to be two or more types of attribute information.

The points are game points possessed by the corresponding player. The points are consumed by the player participating in an event.

The region information 21 is information relating to each region included in the field. For example, the region information 21 illustrated in FIG. 4 includes an event ID, attribute information, cost points, and cumulative score in association with a region ID that can identify a region.

The event ID is an identifier of an in-game event (subgame) in which a player participates in order to acquire the corresponding region. In the exemplary embodiment, the event is a battle event with an NPC in which the player uses game media. Based on the event ID, for example the type, strength, or the like of the NPC are determined.

The attribute information indicates attribute information associated with the corresponding region. In the exemplary embodiment, one piece of attribute information can be associated with one region.

The cost points indicate the points necessary for the player to participate in the event of the corresponding region. The cost points are stored in correspondence with each piece of attribute information.

The cumulative score is stored in correspondence with each piece of attribute information. The cumulative score is the cumulative value of the score obtained during the event of the corresponding region by each player with whom the same attribute information is associated. In the exemplary embodiment, the score is the damage inflicted on the NPC by the user during the event.

The player determination unit 13 illustrated in FIG. 1 determines a plurality of players that participate in the special battle. The plurality of players include the player controlled by the user. Each player other than the user may, for example, be a player controlled automatically by the information processing device 10 or a player controlled by another user.

The player determination unit 13 stores different attribute information in the memory unit 12 in association with each of at least two players. The player determination unit 13 may associate the same attribute information with two or more players.

The point provision unit 14 provides a predetermined number of points (for example, 100 points) to each player and stores the points in the memory unit 12.

Figure 5:
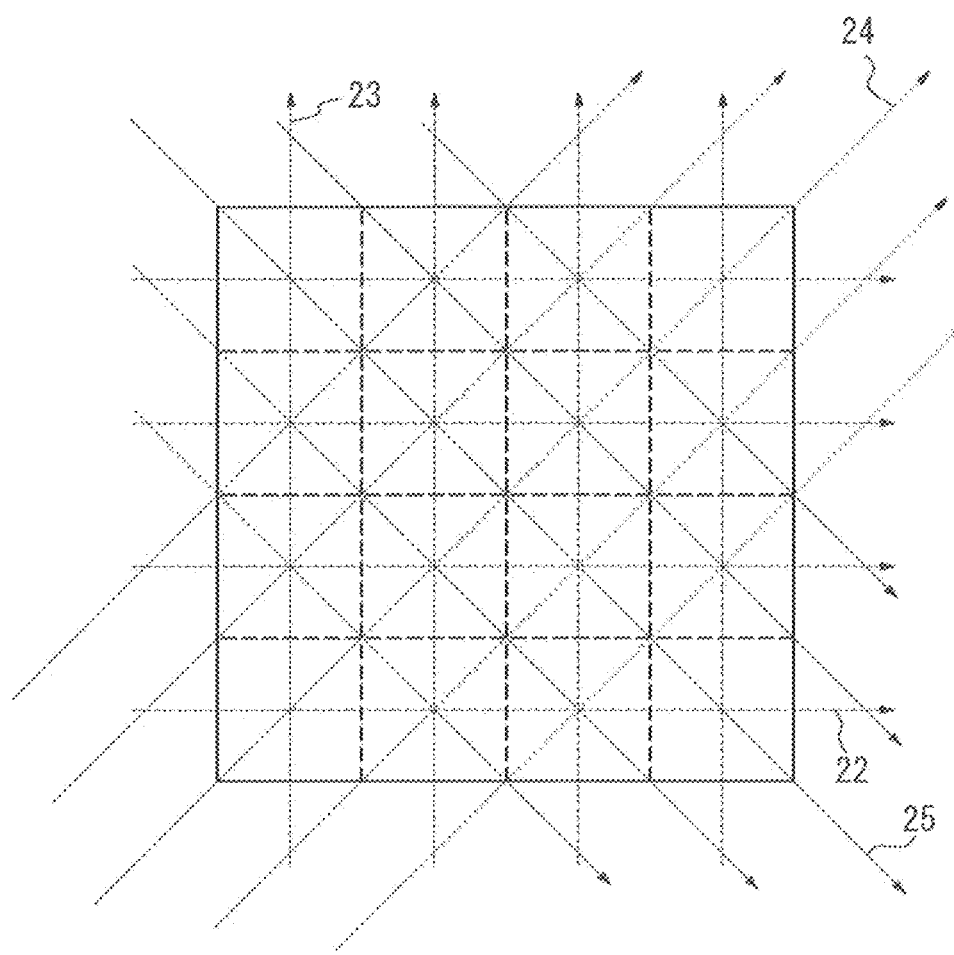
FIG. 5 illustrates axes on the field in FIG. 2.

The field determination unit 15 determines the field, which includes a plurality of regions, used in the special battle and at least one axis on the field. In the exemplary embodiment, the field determination unit 15 determines four horizontal axes, four vertical axes, five axes in the upper-right direction, and five axes in the lower-right direction. For example, the horizontal axis 22 illustrated in FIG. 5 traverses regions a1, b1, c1, and d1. The vertical axis 23 traverses regions a1, a2, a3, and a4. The axis 24 in the upper-right direction traverses regions a1, b2, c4, and d4. The axis 25 in the lower-right direction traverses regions a4, b3, c2, and d1. The number and direction of the axes on the field may be set freely. The field determination unit 15 may automatically generate the field and the axes, or the field and axes may be stored in advance in the memory unit 12.

The field determination unit 15 sets a predetermined event (event ID) for each region and stores the event ID in the memory unit 12.

The field determination unit 15 can set a predetermined number of cost points (for example, 10 points) for each region and stores the predetermined number of cost points in the memory unit 12. The number of cost points may be set freely. For example, the number of cost points may be set higher as the area of the region is larger.

The field determination unit 15 can set the cost points to be higher for a second region than for a first region, where the first region is such that another region exists on both sides along at least one axis in the field, and the second region is a region other than the first region. For example, in the field illustrated in FIG. 2, regions a1, a4, d1, and d4 are second regions, and the other regions are first regions. A predetermined number of cost points (for example, 10 points) is set for each first region. A larger number of cost points than for the first region (for example, 30 points) is set for regions a1, a4, d1, d4, which are second regions.

The display unit 16 is configured using, for example, an organic EL display or the like and can display various game screens. Details on the game screens are provided below. The display unit 16 may, for example, be configured as a touch panel and function as an interface to receive user input by user operation.

Upon a player selecting at least one region included in the field, the event processing unit 17 executes processing for the event of the selected region. As the processing for the event in the exemplary embodiment, the event processing unit 17 executes processing for a battle between the player and an NPC. When points possessed by the player are equal to or greater than the cost points used for that user, the event processing unit 17 can subtract the cost points from the player's points, stores the result in the memory unit 12, and begins processing for the event. The cost points used for the player are the cost points that, for the selected region, correspond to the same attribute information as the player.

Based on the processing result for the event, the event processing unit 17 determines whether newly to associate the attribute information of the player that participated in the event with the region. For example, when the processing result for the event satisfies a predetermined condition, the event processing unit 17 newly stores the attribute information of the player in the memory unit 12 in association with the region. When other attribute information is already associated with the region, the attribute information is updated to the newly associated attribute information. The region with which the attribute information is associated is established as the region occupied by one or more players with whom the same attribute information as the region is associated.

As an example, the following describes a configuration whereby the event processing unit 17 determines whether newly to associate the attribute information with the region based on the cumulative damage inflicted on the NPC. The event processing unit 17 calculates the cumulative value of the damage inflicted on the NPC by the player participating in the event and the damage inflicted on the NPC in the past by other players with whom the same attribute information as the player is associated and stores the cumulative value in the memory unit 12. In other words, the event processing unit 17 calculates the cumulative damage corresponding to the attribute information of the player and stores the result in the memory unit 12. The event processing unit 17 retrieves the cumulative damage corresponding to the attribute information of the player and corresponding to each different piece of attribute information from the memory unit 12. When the cumulative damage corresponding to the attribute information of the player is larger than the cumulative damage corresponding to any other piece of attribute information, the event processing unit 17 then newly stores the attribute information of the player in the memory unit 12 in association with the region. The predetermined condition for newly associating the attribute information with the region is not limited to the above-described condition. Any condition may be adopted, such as the player defeating the NPC.

For a player that has acquired two regions that sandwich a region occupied by another player, the event processing unit 17 can execute processing to further acquire the sandwiched region (intermediate region).

Specifically, upon newly associating attribute information with a region p selected by the player, the event processing unit 17 determines whether another region q with which the same attribute information as region p is associated exists along an axis in the field at a distance from the region p. When region q and region p exist at a distance from each other, the event processing unit 17 determines whether attribute information different from that of region p is associated with the intermediate region(s) sandwiched between regions p and q along the axis. The intermediate region(s) include all of the regions along the axis between the two regions. When different attribute information than that of region p is associated with the intermediate region(s), the event processing unit 17 newly stores the same attribute information as that of region p in the memory unit 12 in association with the intermediate region(s). The event processing unit 17 executes the above-described processing for each axis passing through the selected region p on the field.

Upon conclusion of the battle, for example due to a predetermined time elapsing from the start of the special battle, the victory/defeat determination unit 18 calculates either or both of a count and a total area of the regions with which each piece of attribute information is associated. Based on the result of calculation, the victory/defeat determination unit 18 determines victory and defeat for the plurality of players. For example, the victory/defeat determination unit 18 determines that each player whose attribute information is the same as the attribute information with the largest calculated count or total area is victorious. Alternatively, the victory/defeat determination unit 18 may determine victory and defeat based on both the calculated count and the total area.

The control unit 19 controls the overall operations of the information processing device 10. For example, the control unit 19 displays and updates various game screens corresponding to progress of the game on the display unit 16. The control unit 19 also executes overall processing for conducting the regular battle and the special battle. During the special battle, the control unit 19 can automatically control at least a portion of players among the plurality of players determined by the player determination unit 13.

The control unit 19 can increase the cost points set for each region in the field in response to an increase in elapsed time of the game (special battle). Furthermore, the control unit 19 can increase the difficulty of the event set for each region in the field in response to an increase in elapsed time of the game. The difficulty of the event is increased by, for example, strengthening the parameters that contribute to the battle, such as the stamina, attack strength, or defense strength of the NPC.

Upon the event processing unit 17 newly associating attribute information with a region, the control unit 19 can change the cost points of the region based on the attribute information of the region and stores the changed cost points in the memory unit 12.

Specifically, the control unit 19 retrieves the attribute information of the region with which attribute information was newly associated from the memory unit 12. The control unit 19 then increases the cost points corresponding to different attribute information than the attribute information of the region. For example, the cost points corresponding to different attribute information than the attribute information of the region are set to a larger value (for example 20 points) than the cost points set by the field determination unit 15 (for example, 10 points). The control unit 19 also decreases the cost points corresponding to the same attribute information as the attribute information of the region. For example, the cost points corresponding to the same attribute information as the attribute information of the region are set to a smaller value (for example 5 points) than the cost points set by the field determination unit 15 (for example, 10 points).

When a player designates at least one region among the plurality of regions and uses a predetermined game medium, the control unit 19 changes the cost points of the designated region. The game medium is, for example, an item in the game. The cost points increase or decrease in accordance with the type of the game medium used. The cost points may also be set to a value determined in accordance with the type of the game medium used. The change in cost points due to use of a game medium is applied to the cost points of the region that correspond to at least one piece of attribute information designated by the player. A predetermined release condition may be set for the change in cost points due to use of the game medium. For example, the change in cost points due to use of the game medium may be canceled after a predetermined time elapses from the point in time at which the game medium was used.

Next, the game screen displayed on the display unit 16 is described. The following describes the case of four players with whom different attribute information A to D is associated. Here, it is assumed that attribute information A is associated with the player controlled by the user.

FIG. 6 illustrates a basic screen 26 for conducting a special battle. The basic screen 26 includes a region 27 displaying the field, a region 28 displaying the remaining time, and a region 29 for information sharing.

The region 27 displaying the field is a region that displays the field determined by the field determination unit 15.

The region 28 displaying the remaining time is a region that displays the remaining time until the time when victory and defeat in the special battle are determined.

The region 29 for information sharing is a region for displaying information shared by players other than any players with whom predetermined attribute information is associated. The shared information is, for example, messages written in a chat format, images, or the like. In the exemplary embodiment, the region 29 for information sharing includes a plurality of tabs 30a, 30b, 30c, and 30d. The attribute information of players sharing information is set for each tab. When one of the tabs is selected by the user, information is displayed that is shared by players with whom the attribute information set for the selected tab is associated.

For example, attribute information A is associated with tab 30a illustrated in FIG. 6. Upon selection of tab 30a, the display switches to information shared by players with whom attribute information A is associated. In other words, the display switches to information shared by players other than players with whom attribute information B, C, and D is associated. Similarly, attribute information A and B are associated with tab 30b. Attribute information A and C are associated with tab 30c. Attribute information A and D are associated with tab 30d.

FIG. 7 illustrates a state in which a region 31 for displaying information is overlapped on the basic screen 26 illustrated in FIG. 6. The region 31 for displaying information is, for example, displayed when the user selects a region, with a long press, in the region 27 displaying the field. The region 31 for displaying information is a region for displaying information related to the selected region.

The information related to the region includes, for example, the cumulative score, time of update, cost, and the like in association with each piece of attribute information. The cumulative score is the cumulative damage inflicted on the NPC of the region by all of the players with whom the corresponding attribute information is associated. The time of update indicates the time when the cumulative score was updated. The cost indicates the cost points used for players with whom the corresponding attribute information is associated. When, for example, the cost changes due to use of a predetermined game medium, the information corresponding to the region further includes information indicating the increase or decrease in cost due to the change and information indicating the remaining time until the change is canceled.

Here, it is assumed that region a3 selected in FIG. 7 is occupied by the player with whom attribute information A is associated. In this case, as compared to the cost points set by the field determination unit 15 (for example 10 points), the cost points corresponding to attribute information A are reduced (for example, 5 points), and the cost points corresponding to other attribute information are increased (for example, 20 points). As described above, the cost points can change due to use of a predetermined medium. For example, in the information related to region a3 included in the region 31 for displaying information illustrated in FIG. 8, the cost corresponding to attribute information A is 5 points. The cost corresponding to attribute information B is 20 points. The cost corresponding to attribute information C is, for example, reduced from 20 points to 15 points by use of a predetermined medium that reduces the cost points by 5 points. The cost corresponding to attribute information D is, for example, increased from 20 points to 999 points by use of a predetermined medium that sets the cost points to 999 points.

Figure 9:
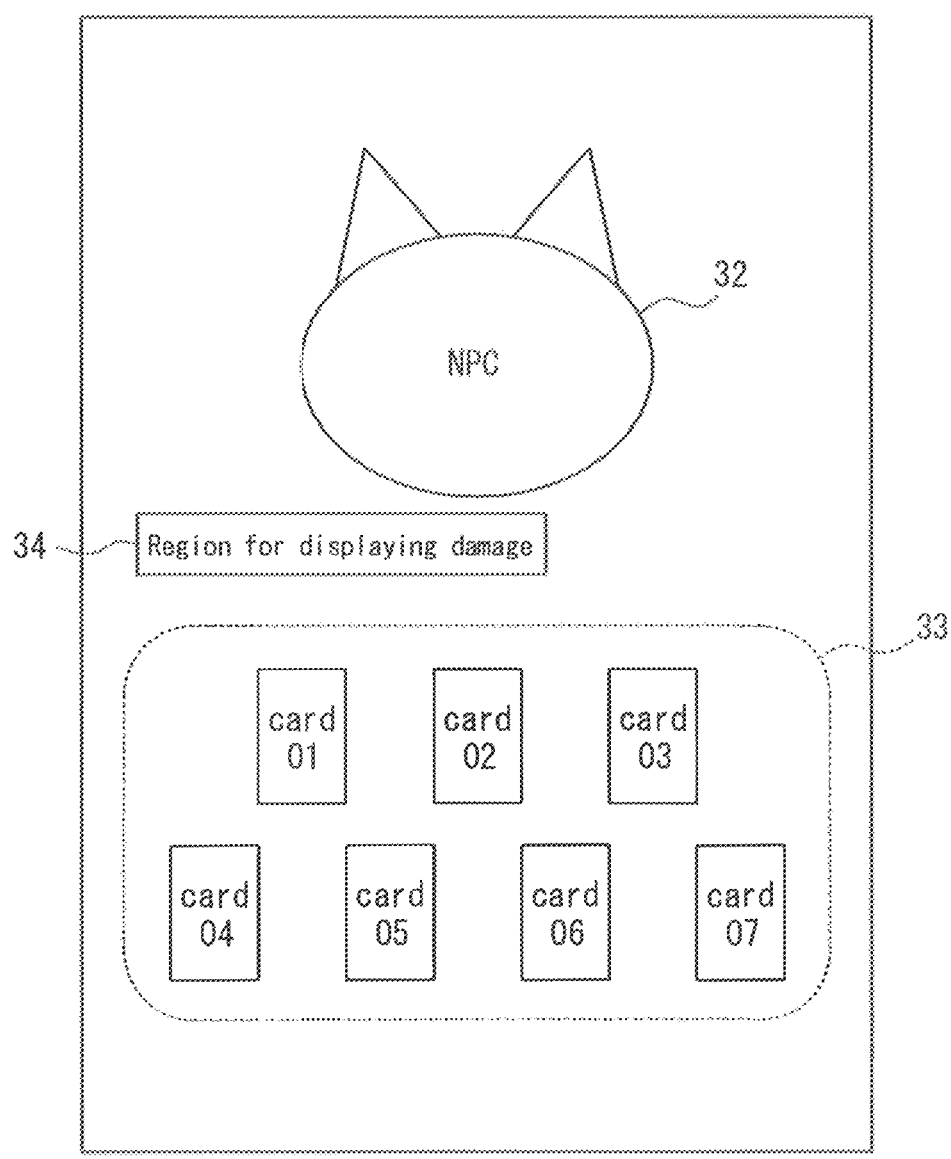
FIG. 9 illustrates an NPC battle screen displayed on the display unit in FIG. 1.

FIG. 9 illustrates an NPC battle screen for the user to battle an NPC during event processing set for a region. The NPC battle screen includes an NPC icon 32, a region 33 for displaying game media, and a region 34 for displaying damage.

The NPC icon 32 is an image indicating the NPC that the user-controlled player battles.

The region 33 for displaying game media is a region for displaying game media used in the battle with the NPC. In the region 33 for displaying game media illustrated in FIG. 9, images of the cards (card 01 to card 07) held by the user are displayed. For example, by the user tapping the image of each card, damage is inflicted on the NPC.

The region 34 for displaying damage is a region displaying the cumulative damage that the player controlled by the user has inflicted on the NPC. Any display method may be adopted in the region 34 for displaying damage, such as displaying a numerical value, an indicator, or the like.

Next, a specific example of how the game (special battle) according to the exemplary embodiment unfolds is described.

Figure 10:
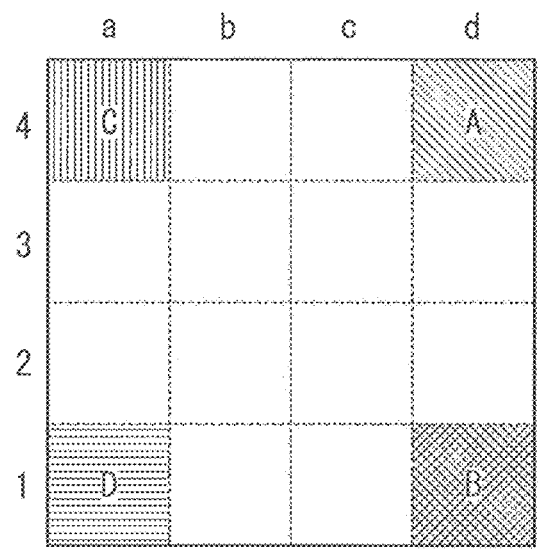
FIG. 10 illustrates an example of the game unfolding.

FIG. 10 illustrates the state of the field at the start time of the special battle. As illustrated in FIG. 10, the player with whom attribute information A is associated (player A) occupies region d4. The player with whom attribute information B is associated (player B) occupies region d1. The player with whom attribute information C is associated (player C) occupies region a4. The player with whom attribute information D is associated (player D) occupies region a1.

Figure 11:
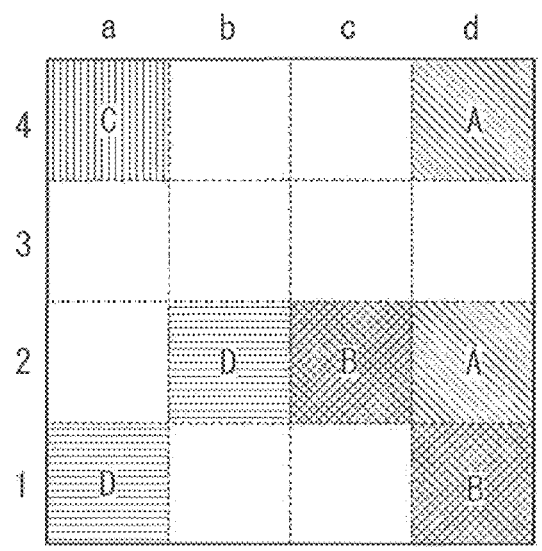
FIG. 11 illustrates an example of the game unfolding.

The battle progresses, and player A participates in the event of region d2 and acquires (occupies) region d2, as illustrated in FIG. 11. Similarly, player B acquires region c2, and player D acquires region b2.

Figure 12:
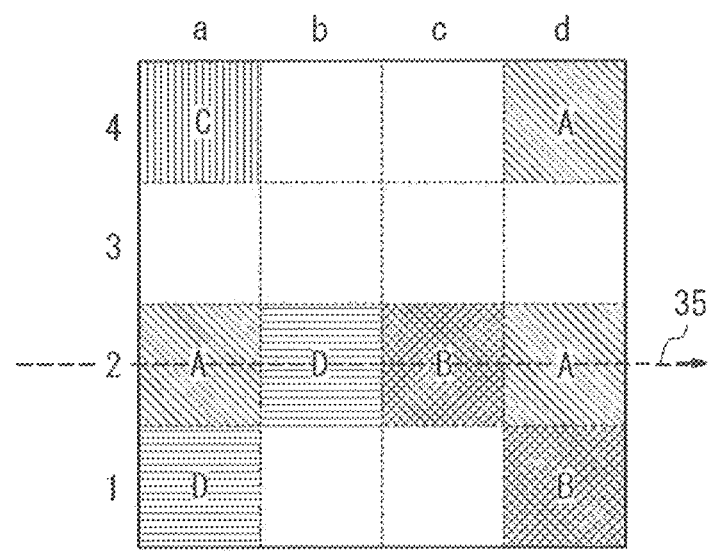
FIG. 12 illustrates an example of the game unfolding.
Figure 13:
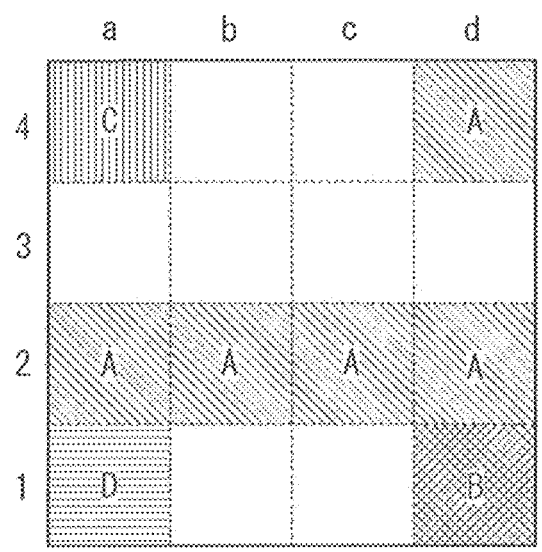
FIG. 13 illustrates an example of the game unfolding.

The battle continues to progress, and player A acquires region a2, as illustrated in FIG. 12. In this case, two regions a2, d2 occupied by player A exist at a distance from each other along an axis 35, determined by the field determination unit 15, in the horizontal direction. Attribute information other than the attribute information A (attribute information B, D) is associated with the regions b2, c2 located between the regions a2, d2. Therefore, as illustrated in FIG. 13, attribute information A is newly associated with the regions b2, c2 located between the regions a2, d2.

Figure 14:
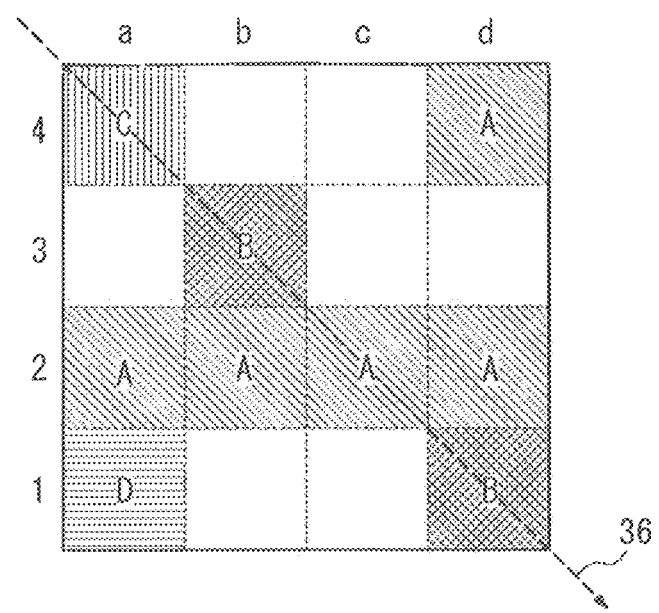
FIG. 14 illustrates an example of the game unfolding.
Figure 15:
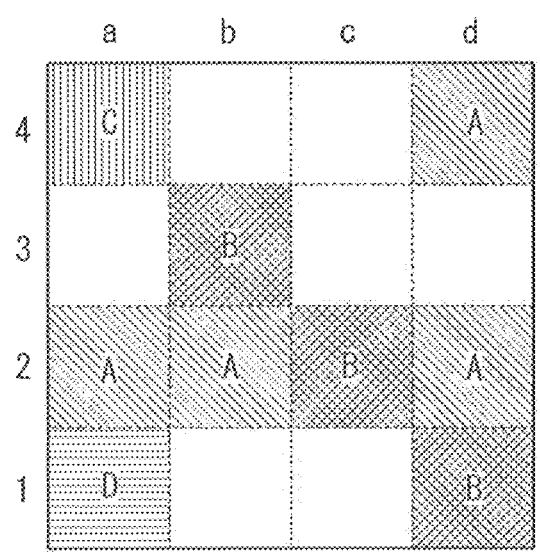
FIG. 15 illustrates an example of the game unfolding.

The battle continues to progress, and player B acquires region b3, as illustrated in FIG. 14. In this case, two regions b3, d1 occupied by player B exist at a distance from each other along an axis 36, determined by the field determination unit 15, in the lower-right direction. Attribute information other than the attribute information B (attribute information A) is associated with the region c2 located between the regions b3, d1. Therefore, as illustrated in FIG. 15, attribute information B is newly associated with the region c2 located between the regions b3, d1.

Next, operations by the information processing device 10 of the exemplary embodiment are described with reference to the flowchart in FIG. 16.

First, the player determination unit 13 determines the plurality of players who participate in the special battle and stores attribute information in the memory unit 12 in association with each player (step S100).

Next, the point provision unit 14 provides a predetermined number of points to each player and stores the points in the memory unit 12 (step S101).

Next, the control unit 19 displays the basic screen 26 on the display unit 16 (step S102).

Subsequently, the control unit 19 executes processing to conduct the battle (step S103).

Upon termination of the processing in step S103, the victory/defeat determination unit 18 determines victory and defeat for the plurality of players (step S104).

Figure 16:
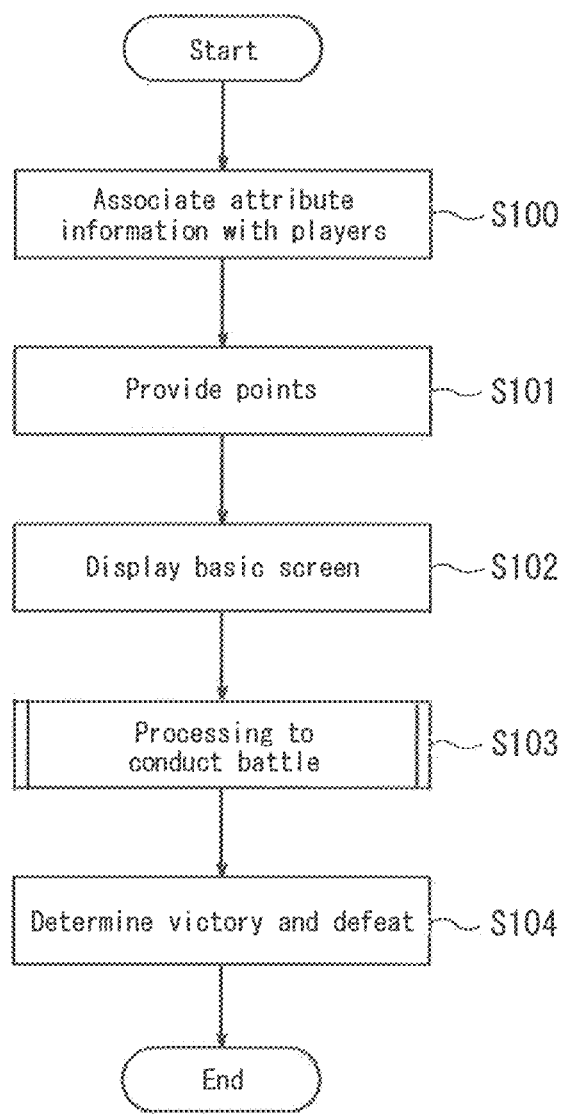
FIG. 16 is a flowchart illustrating operations of the information processing device in FIG. 1.
Figure 17:
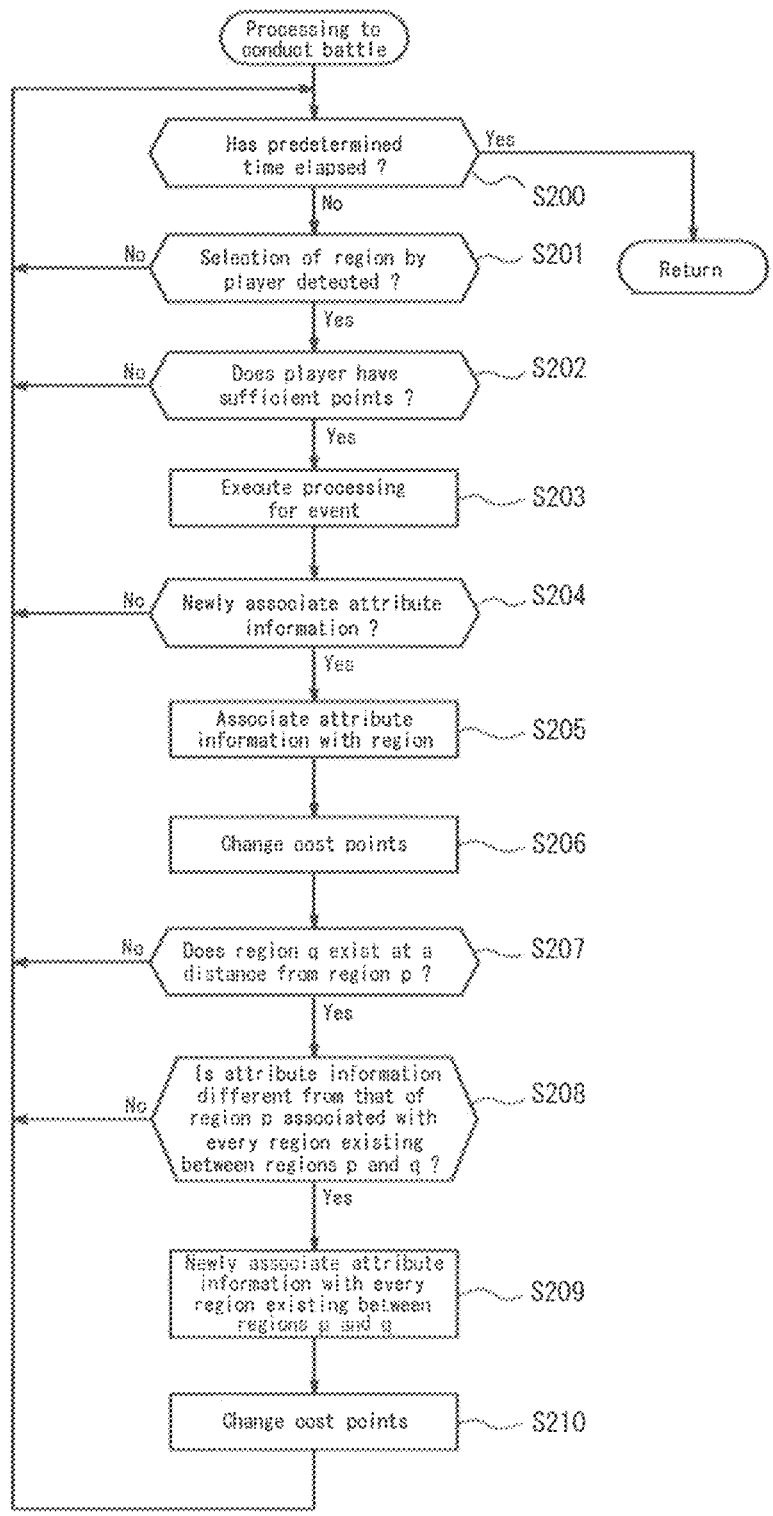
FIG. 17 is a flowchart illustrating the battle processing in FIG. 13.

Next, a specific example of the processing executed by the information processing device 10 of the exemplary embodiment in step S103 of FIG. 16 is described with reference to the flowchart in FIG. 17.

First, the control unit 19 for example determines whether a predetermined time (such as 30 minutes) has elapsed from the start of the present processing (step S200). When a predetermined time has elapsed (step S200: Yes), processing proceeds to step S104 in FIG. 16.

Conversely, when the predetermined time has not elapsed (step S200: No), the control unit 19 determines whether a region on the field has been selected by one of the players (step S201). When no region has been selected (step S201: No), processing returns to step S200.

On the other hand, when a region has been selected (step S201: Yes), the event processing unit 17 determines whether the player that selected the region possesses points equal to or greater than the cost points of the selected region (step S202). When the player does not possess enough points (step S202: No), processing returns to step S200.

Conversely, when the player possesses enough points (step S202: Yes), the event processing unit 17 subtracts the cost points from the player's points, stores the result in the memory unit 12, and executes processing for the event of the selected region (step S203). In the processing for the event, for example a battle between the player and an NPC takes place.

Next, based on the processing result for the event in step S203, the event processing unit 17 determines whether newly to associate the attribute information of the player with the region (step S204). For example when the processing result for the event does not satisfy a predetermined condition, the event processing unit 17 determines not to associate the attribute information. When it is determined not to associate the attribute information (step S204: No), processing returns to step S200.

Conversely, when the processing result for the event does satisfy a predetermined condition, the event processing unit 17 determines to associate the attribute information. Upon determining to associate the attribute information (step S204: Yes), the event processing unit 17 newly stores the attribute information of the player in the memory unit 12 in association with the region (step S205).

Next, based on the attribute information of the region with which attribute information was newly associated in step S205, the control unit 19 changes the cost points of the region and stores the changed cost points in the memory unit 12 (step S206).

Next, the event processing unit 17 determines whether, with respect to region p with which attribute information was newly associated in step S205, another region q with which the same attribute information as region p is associated exists along a predetermined axis in the field at a distance from region p (step S207). When no region q exists at a distance from region p (S207: No), processing returns to step S200.

Conversely, when region q exists at a distance from region p (step S207: Yes), the event processing unit 17 determines whether attribute information different from that of region p is associated with intermediate region(s) sandwiched between the regions p and q along the axis in step S207 (step S208). When attribute information different from that of region p is not associated with at least one region included in the intermediate region(s) (step S208: No), processing returns to step S200.

Conversely, when attribute information different from that of region p is associated with the intermediate region(s) (step S208: Yes), the event processing unit 17 newly stores the same attribute information as that of region p in the memory unit 12 in association with each region located between the two regions p and q (step S209).

Based on the attribute information of each region with which attribute information was newly associated in step S209, the control unit 19 then changes the cost points of each region and stores the changed cost points in the memory unit 12 (step S210).

As described above, according to the information processing device 10 of the exemplary embodiment, attribute information is associated with a region selected by the player based on the processing result for the event of the region. Based on either or both of a count and a total area of the regions with which each piece of attribute information is associated, victory and defeat of the plurality of players in the battle game are determined. In this way, the battle game becomes more strategic, since the user for example conducts the battle while taking into consideration two different aspects: attacking in an event, such as battle with an NPC, and obtaining regions on the field.

When the points possessed by the player are equal to or greater than the cost points of the selected region, the information processing device 10 subtracts the cost points from the points and executes the event of the region. The value that the region has for the player varies depending on the ease of acquiring the region (difficulty of the event), the area of the region, and the like. By setting the cost points as a new value of the region for the player, the user selects a region taking the cost points into consideration, thereby making the game even more strategic.

When the attribute information of a player is newly associated with a region p selected by the player, the information processing device 10 determines whether another region q with which the same attribute information as the region p is associated exists at a distance from the region p along a predetermined axis in the field. When region q and region p exist at a distance from each other, the information processing device 10 determines whether attribute information different from that of region p is associated with the intermediate region(s) sandwiched between regions p and q. When attribute information different from that of region p is associated with the intermediate region(s), the information processing device 10 newly associates the same attribute information as that of region p with the intermediate region(s). In this way, when a player uses a newly acquired region to sandwich a region occupied by another player, the player can newly acquire the sandwiched region, thereby making the player's choice of a region even more strategic.

The information processing device 10 sets the cost points to be higher for a second region than for a first region, where the first region is such that another region exists on both sides along at least one axis in the field, and the second region is a region other than the first region. In this way, a large number of cost points is set for the second region, which is not sandwiched by regions occupied by another player and is thus highly valuable for players. Since players thus take the value of the region and the cost points into consideration when selecting a region, the game becomes even more strategic.

As described above, players can effectively acquire regions by using the newly acquired region to sandwich a region occupied by another player. Therefore, in the early stage of the game, it is conceivable that none of the players will attempt to acquire a region. Here, increasing the cost points set for each region in response to an increase in elapsed time of the game can make it advantageous to acquire a region in the early stage of the game and therefore can make players more proactive in the early stage of the game. Furthermore, increasing the difficulty of the event set for each region in response to an increase in elapsed time of the game yields a similar effect.

Upon attribute information being newly associated with a region, the information processing device 10 changes the cost points of the region based on the attribute information of the region. With this configuration, as described below, it can become even more advantageous for a player to acquire a region, therefore making players more proactive in the early stage of the game.

For example, it may be more advantageous for a player to acquire a region occupied by another player than a region that no player occupies. Therefore, in the early stage of the game, it is conceivable that none of the players will attempt to acquire a region. Here, when a player acquires a region, the cost points used by another player are increased. This configuration makes it advantageous to acquire a non-occupied region before other players do and therefore can make players more proactive in the early stage of the game. When a player acquires a region, the cost points used by that player are decreased. This configuration makes it easy for a player that has acquired a region to select the region again and further increase the cumulative score. Therefore, this configuration can make it advantageous to acquire a non-occupied region before other players do and therefore can make players more proactive in the early stage of the game.

When a predetermined game medium is used, the information processing device 10 changes the cost points of a designated region. It thus becomes possible for a player to decrease the cost points of a region the player wants to acquire or to increase the cost points of a region the player wants to block another player from acquiring, thus making the game even more strategic.

In a battle between a plurality of players, a player may wish to share information only with certain other players depending on battle conditions. For example, if the player with whom attribute information D is associated occupies the largest number of regions, another player may wish to request the cooperation of other players in secret. Since the information processing device 10 displays information shared by players other than any player with whom at least predetermined attribute information is associated, for example cooperation can be sought from other players unbeknownst to the player with whom attribute information D is associated, thus allowing for inter-player communication relating to a variety of strategies.

Although the exemplary embodiments have been described based on drawings and examples, it is to be noted that various changes and modifications will be apparent to those skilled in the art based on the present disclosure. Therefore, such changes and modifications are to be understood as included within the scope of the embodiments. For example, the functions and the like included in the various means and steps may be reordered in any logically consistent way. Furthermore, means or steps may be combined into one or divided.

Figure 18:
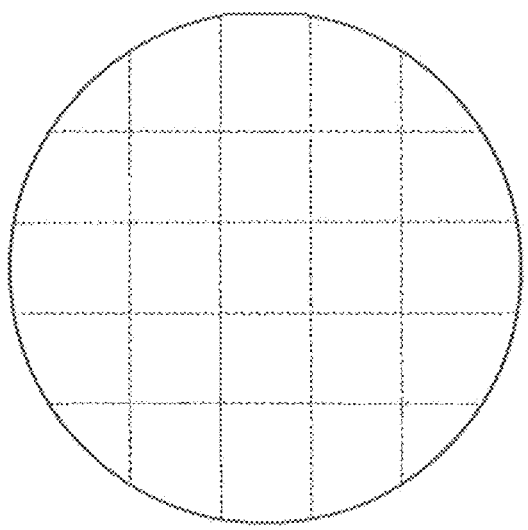
FIG. 18 illustrates a field in a game according to a modification to the present invention.
Figure 19:
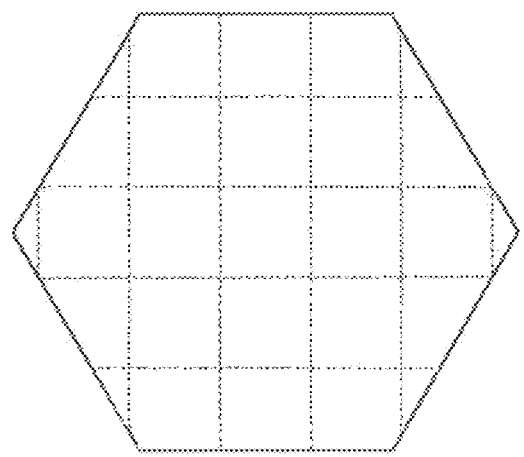
FIG. 19 illustrates a field in a game according to a modification to the present invention.

The field may have, for example, a circular or polygonal shape. For example, FIG. 18 illustrates an example of a circular field, and FIG. 19 illustrates an example of a hexagon field. In these fields, the area per region varies. The game becomes even more interesting by using these fields. For example, regions with a large area become more important when victory and defeat are determined based on the total area of regions. Conversely, when victory and defeat are determined based on a count of regions, then regardless of whether they have a small area, regions that are unlikely to change due to the attribute of other regions become more important. Users therefore can formulate their strategy in accordance with the shape of the field, making the game more interesting. Each region included in the field may have any shape, such as a circle, a hexagon, or the like or any other shape known to one having ordinary skill in the art.

A three-dimensional field and regions may also be adopted. In this case, the victory/defeat determination unit 18 for example determines victory and defeat for the plurality of players based on either or both of a count and a total volume of regions with which each piece of attribute information is associated.

The event in which players participate may, for example, be a puzzle game, a quiz game, or the like. The event may be a game that is played without using game media.

In the above-described exemplary embodiment, an information processing device 10 that executes a game has been described, yet the exemplary embodiment may be embodied as a communication system, provided with a terminal device and a server device, that executes a battle game. In this case, for example either or both of the terminal device and server device is provided with each of the constituent elements of the information processing device 10.

An information processing device such as a computer, mobile phone, or the like may be used to function as the information processing device 10 according to the above embodiment. In such an information processing device, a program containing a description of the processing for achieving the functions of the information processing device 10 according to the embodiment is stored in a memory unit of the information processing device, and the functions are achieved by the central processing unit (CPU) of the information processing device reading and executing the program.

What is claimed is:

1. A computer-readable non-transitory recording medium, storing instructions to be executed on a computer functioning as an information processing device configured to execute a game, the instructions causing the computer to execute the steps of:
   displaying a field including a plurality of zones;
   receiving a selection of at least one zone from among the plurality of zones by a player, and, when the at least one zone is selected from among the plurality of zones by the player, executing processing for an event set for the at least one selected zone, by:
   determining whether a first point value possessed by the player is equal to or greater than a second point value set for the at least one selected zone;
   when the first point value possessed by the player is equal to or greater than a second point value set for the at least one selected zone, subtracting the second point value from the first point value and executing a first set of processing for the event of the at least one selected zone;
   receiving, from the player, at least one player interaction with the event, and, based on receipt of the at least one player interaction from the player, executing a second set of processing for the event set for the at least one selected zone comprising resolving a processing result of the event;
   determining, with an event processing unit, based on the processing result of the event, whether the player is eligible to shift control of the at least one selected zone, and,
   when the player is eligible to shift control of the at least one selected zone, shifting control of the at least one selected zone to the player.

2. The computer-readable non-transitory recording medium according to claim 1, further comprising:
   tracking an elapsed time of the game;
   prior to subtracting the second point value from the first point value, determining that an increase in elapsed time of the game has reached at least a predetermined value, and adjusting the second point value set for the at least one selected zone.

3. The computer-readable non-transitory recording medium according to claim 2,
   wherein adjusting the second point value comprises, prior to receiving the selection of the at least one zone by the player, applying a point value increase to each of the plurality of zones including the at least one zone.

4. The computer-readable non-transitory recording medium according to claim 2, further comprising:
   after adjusting the second point value set for the at least one selected zone, increasing a difficulty of the event set for the at least one selected zone, wherein resolving the processing result of the event is based on the difficulty.

5. The computer-readable non-transitory recording medium according to claim 4, wherein the event comprises a battle event and wherein increasing the difficulty of the event comprises strengthening at least one statistic of a non-player character fought in the battle event.

6. The computer-readable non-transitory recording medium according to claim 2, further comprising:
prior to determining that the increase in elapsed time of the game has reached at least a predetermined value, activating a game medium, and, based on activation of the game medium, performing a first adjustment of the second point value set for the at least one selected zone;
wherein adjusting the second point value set for the at least one selected zone comprises performing a second adjustment of the second point value after the first adjustment.

7. The computer-readable non-transitory recording medium according to claim 6, wherein tracking the elapsed time of the game is triggered by activation of the game medium, and wherein the second adjustment is a cancellation of the first adjustment.

8. The computer-readable non-transitory recording medium according to claim 2, further comprising:
determining when the elapsed time has reached a predetermined time;
upon the elapsed time reaching the predetermined time, evaluating a state of the field and a degree of control of the field held by each of the player and a second player; and
determining that the player has won the game and providing a reward to the player based on the player having a higher degree of control of the field than the second player.

9. The computer-readable non-transitory recording medium according to claim 1, further comprising:
prior to determining whether the first point value possessed by the player is equal to or greater than the second point value set for the at least one selected zone, activating a game medium; and
performing an adjustment to the second point value set for the at least one selected zone based on the use of the game medium.

10. The computer-readable non-transitory recording medium according to claim 9, further comprising:
associating a release condition with the adjustment provided to the second point value;
determining that the release condition is met; and
canceling the adjustment provided to the second point value when the release condition is met.

11. The computer-readable non-transitory recording medium according to claim 9, wherein the game medium is a game medium stored in association with the player, comprising at least one of a game card held by the player, a game character owned by the player, or a weapon, armor, or item held by the player.

12. The computer-readable non-transitory recording medium according to claim 9, further comprising:
providing, as a reward for the game, at least one further game medium usable in a subsequent game, and storing said further game medium in association with the player.

13. The computer-readable non-transitory recording medium according to claim 9, wherein activating the game medium is performed by a second player prior to a step of receiving the selection of the at least one zone from among the plurality of zones by the player.

14. The computer-readable non-transitory recording medium according to claim 1, further comprising:
following a step of shifting control of the at least one selected zone to the player, determining, based on a position of the at least one selected zone on the field and a position of at least one other zone on the field, whether to shift control of the at least one other zone on the field in addition to shifting control of the at least one selected zone on the field; and
shifting control of the at least one other zone on the field in addition to shifting control of the at least one selected zone on the field.

15. The computer-readable non-transitory recording medium according to claim 14, wherein determining, based on the position of the at least one selected zone on the field and a position of the at least one other zone on the field whether to shift control of the at least one other zone on the field in addition to shifting control of the at least one selected zone on the field comprises:
determining whether the at least one other zone on the field is an intermediate zone in an intermediate region provided, on a predetermined axis, between the at least one selected zone on the field and a further player-controlled zone; and
when the at least one other zone on the field is the intermediate zone, shifting control of the at least one other zone.

16. The computer-readable non-transitory recording medium according to claim 15, wherein a plurality of intermediate zones controlled by a plurality of other players are provided in the intermediate region, and further comprising shifting control of the plurality of intermediate zones from the plurality of other players to the player.

17. The computer-readable non-transitory recording medium according to claim 1, wherein the at least one selected zone is associated with a degree of control of each of the player and the second player; and
wherein determining, with the event processing unit, based on the processing result of the event, whether the player is eligible to shift control of the at least one selected zone further comprises determining a difference in the degree of control of the player and the second player.

18. The computer-readable non-transitory recording medium according to claim 17, wherein a degree of control of each of the player and the second player is based on a comparison of: a cumulative damage inflicted on a non-player character by the player based on at least the at least one player interaction, and a cumulative damage inflicted on the non-player character by the second player; and
wherein the player acquires the at least one selected zone when cumulative damage inflicted on the non-player character by the player is greater than cumulative damage inflicted by the second player.

19. A system comprising a terminal device and a server device and configured to execute a game, wherein the game comprises steps of:
displaying a field including a plurality of zones;
receiving a selection of at least one zone from among the plurality of zones by a player, and, when the at least one zone is selected from among the plurality of zones by the player, executing processing for an event set for the at least one selected zone, by:

determining whether a first point value possessed by the player is equal to or greater than a second point value set for the at least one selected zone;

when the first point value possessed by the player is equal to or greater than a second point value set for the at least one selected zone, subtracting the second point value from the first point value and executing a first set of processing for the event of the at least one selected zone;

receiving, from the player, at least one player interaction with the event, and, based on receipt of the at least one player interaction from the player, executing a second set of processing for the event set for the at least one selected zone comprising resolving a processing result of the event;

determining, with an event processing unit, based on the processing result of the event, whether the player is eligible to shift control of the at least one selected zone, and, when the player is eligible to shift control of the at least one selected zone, shifting control of the at least one selected zone to the player.

20. A method of controlling a game executed by an information processing device, the method comprising:

displaying a field including a plurality of zones;

receiving a selection of at least one zone from among the plurality of zones by a player, and, when the at least one zone is selected from among the plurality of zones by the player, executing processing for an event set for the at least one selected zone, by:

determining whether a first point value possessed by the player is equal to or greater than a second point value set for the at least one selected zone;

when the first point value possessed by the player is equal to or greater than a second point value set for the at least one selected zone, subtracting the second point value from the first point value and executing a first set of processing for the event of the at least one selected zone;

receiving, from the player, at least one player interaction with the event, and, based on receipt of the at least one player interaction from the player, executing a second set of processing for the event set for the at least one selected zone comprising resolving a processing result of the event;

determining, with an event processing unit, based on the processing result of the event, whether the player is eligible to shift control of the at least one selected zone, and, when the player is eligible to shift control of the at least one selected zone, shifting control of the at least one selected zone to the player.

\* \* \* \* \*